SOLID STATE SWITCHING REGULATOR CIRCUIT

Filed March 16, 1965 2 Sheets-Sheet 1

INVENTOR.
Robert R. Atherton,
BY
H. W. Losche
Att'ys.

SOLID STATE SWITCHING REGULATOR CIRCUIT

Filed March 16, 1965 2 Sheets-Sheet 2

INVENTOR.
Robert R. Atherton,
BY
H. H. Losche
Att'ys.

3,383,584

SOLID STATE SWITCHING REGULATOR CIRCUIT

Robert R. Atherton, Indianapolis, Ind., assignor to the United States of America as represented by the Secretary of the Navy Filed Mar. 16, 1965, Ser. No. 440,330
7 Claims. (Cl. 323—4)

ABSTRACT OF THE DISCLOSURE

A solid state regulator circuit for controlling the charging current from either a current limited or an unlimited energy source to a load. The regulator compares the level of charging current, supplied by the source to the load, with a reference level. Any difference between the two signals is amplified by a differential amplifier and combined with the output signal of a sawtooth generator, the combined signal being applied to a bistable flip-flop modulator which, in turn, controls the "on" and "off" times of a modulated solid state switching circuit coupled in series between the charging source and the load. Varying the "on" and "off" times of the switching circuit varies the average value of its rectangular output waveform, which is then coupled through an integrating filter circuit for providing to the load a smooth direct current signal whose magnitude is equal to the average value of the rectangular waveform.

The invention described herein may be manufactured and used by or for the Government of the United States of America for governmental purposes without the payment of any royalties thereon or therefor.

BACKGROUND OF THE INVENTION

The present invention is generally related to electrical regulation circuitry and more particularly to a solid state switching type of regulator for applications such as the control of charging current delivered by a bank of solar cells to a satellite battery pack.

The power supply for a satellite often is comprised of a bank of solar cells which, when activated by solar energy, provide charging current to a storage means such as a battery pack in the satellite. Allowances must be made for degradation of the solar cells due to radiation damage throughout the lifetime of the satellite. Therefore, at the beginning of life of the satellite, the solar cell output level is necessarily designed to be greater than that which is required to maintain the battery pack fully charged. Consequently, some provision must be made to regulate the level of charging current supplied to the batteries.

Present operational satellite systems often employ several conventional series type regulators per satellite. Due to the inherent low efficiency of these conventional series type regulators, the series pass transistors associated therewith are required to dissipate a significant amount of power and thus must be provided with heat sink mountings at a location remote from the remainder of the regulator circuitry. In addition, at some critical time when the solar cells have become degraded to such an extent that regulation is no longer possible because their output level never exceeds the desired charging level of the battery pack, a remote ground command signal must be transmitted to the satellite, conditions permitting, to cause the series pass transistors to become shorted thus effectively coupling the solar cells directly across the battery pack in order to achieve maximum satellite life.

SUMMARY OF THE INVENTION

The present invention overcomes these disadvantages of conventional series type regulator circuits by providing a novel form of switching regulator circuit which performs as though it were a direct current transformer capable of automatically adjusting its turns ratio to deliver constant load power. As a consequence, near the end of satellite life when the power output level of the degraded solar cells is limited, the invention will automatically operate at the point of solar cell maximum power output, independent of the voltage-current combination yielding this power. As the solar cells become degraded, the duty cycle of the switching regulator circuitry of this invention increases in a smooth, continuous manner until a state of 100 percent conduction is achieved, without the need for any remote ground control signal to be transmitted to the satellite. At the point where the switching regulator duty cycle approaches 100 percent conduction, the solar cells have become degraded to the extent that regulation is just possible. As these cells become further degraded, their decreasing output level makes continued regulation thereof neither necessary nor possible, thus the invention automatically maintains a level of 100 percent conduction, thereby effectively removing itself from the regulation function.

An object of the present invention is the provision of an electrical regulator circuit for controlling the level of the energy supplied by a source of energy to a load.

Another object is to provide a new and improved, completely solid state electrical regulator circuit for controlling the level of the energy supplied by a source of energy to a storage means.

A further object of the invention is the provision of a new and novel, completely solid state, electronic switching regulator circuit for controlling the level of charging current supplied by a source of energy to a storage means.

Still another object is to provide a new and novel, completely solid state, electronic switching regulator circuit for automatically controlling the level of charging current supplied by a bank of solar cells to a battery pack in a satellite.

Yet another object of the present invention is the provision of a completely solid state switching regulator circuit for automatically controlling the output level of a bank of solar cells to maintain an optimum level of charging current to a battery pack throughout the useful life of a satellite.

BRIEF DESCRIPTION OF THE DRAWINGS

Other objects and features of the invention will become apparent to those skilled in the art as the disclosure is revealed in the following detailed description and considered in connection with the accompanying drawings in which like reference numerals designate like parts throughout the figures thereof, and wherein.

DESCRIPTION OF THE PREFERRED EMBODIMENT

Figure 1:
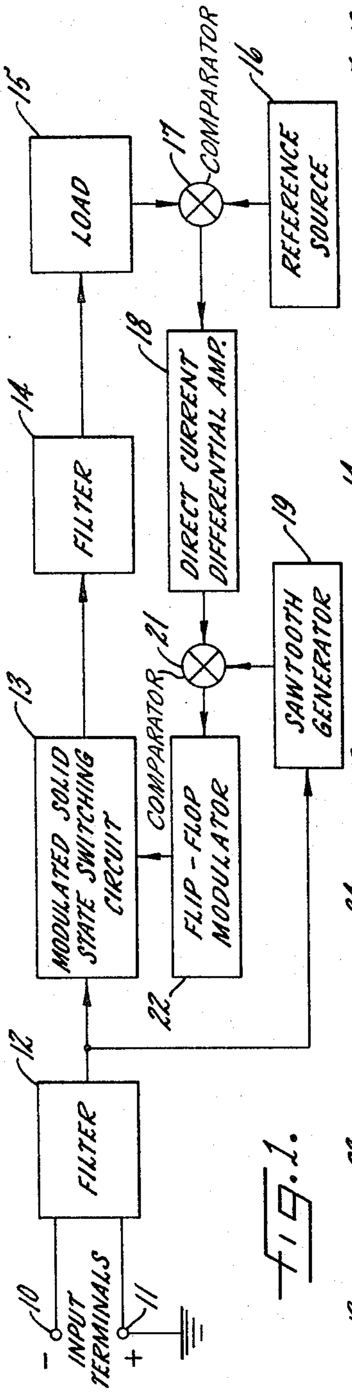
FIGURE 1 is a basic block diagram of the invention.

Referring now to FIGURE 1, there is shown a pair of input terminals 10 and 11 for coupling to a source of energy; these terminals are coupled to an isolating filter circuit 12 which has its output coupled to a modulated solid state switching circuit 13, and also to a sawtooth function generating circuit 19. The switching circuit 13 is coupled via an integrating filter circuit 14 to a load 15. A sample of the energy supplied to load 15 is coupled to a comparator 17 which also is coupled to a reference source 16. Comparator 17 has its output coupled to a direct current differential amplifier circuit 18, the output of which is coupled to a comparator 21 which receives another input signal from repetitive sawtooth function generator 19 and provides an output signal to a flip-flap modulator circuit 22. The output of modulator circuit 22 is coupled to, and controls the "OPEN" and "CLOSED" portions of each period of, solid state switching circuit 13.

Figure 2:
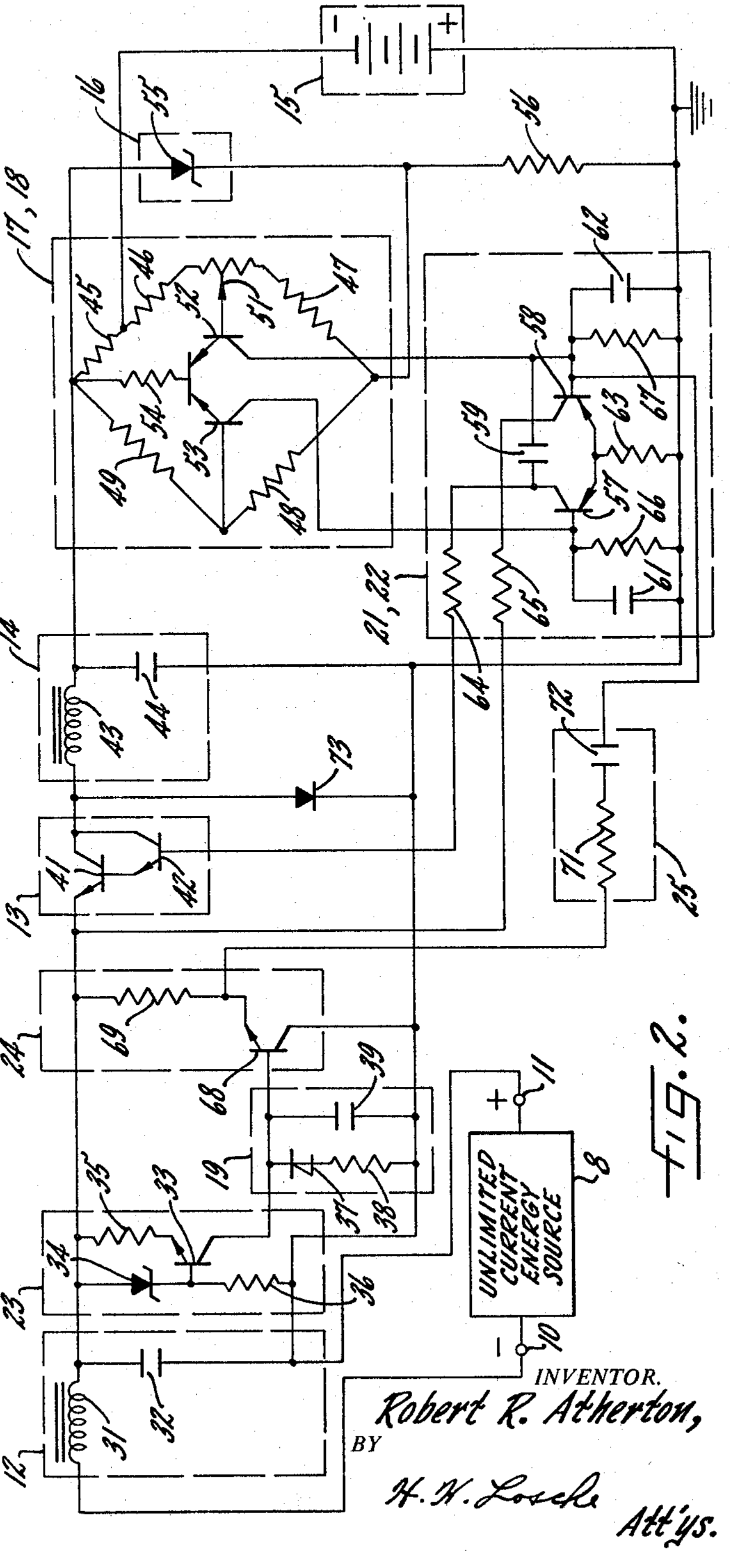
FIGURE 2 shows a schematic diagram of one embodiment of the invention which may be utilized to regulate the energy delivered to a load when the energy source employed is capable of supplying relatively unlimited currents for short periods of time, such as a battery.

In FIGURE 2, an unlimited-current type of energy source 8 has its negative and positive terminals respectively, coupled to input terminals 10 and 11 which are, in turn, coupled to isolating filter circuit 12 comprised of an inductance 31 and a capacitance 32. Filter circuit 12 is coupled via a constant current generating circuit 23 comprised of a transistor 33, a Zener reference diode 34, and resistances 35 and 36, to sawtooth function generating circuit 19 comprised of a four-layer Shockley diode 37, a resistance 38, and a capacitance 39. Filter circuit 12 is also coupled directly to modulated solid state switching circuit 13 comprised of a switching transistor 41 and a driving transistor 42. The output of switching circuit 13 is coupled via integrating filter circuit 14 comprised of an inductance 43 and a capacitance 44, and a resistance 45 in block "17, 18," to load 15 indicated in the form of a battery to be charged. Block "17, 18," which incorporates the comparator and direct current differential amplifier circuitry shown in separate blocks 17 and 18 in FIGURE 1, is comprised of a bridge circuit including resistances 45, 46, 47, 48, and 49, and the fixed resistance portion of a potentiometer 51, and a differential amplifier comprised of transistors 52 and 53 and a resistance 54. A reference potential is provided to the bridge circuit by a Zener reference diode 55 in block 16. A resistance 56 couples reference diode 55 to ground potential. The output of the differential amplifier circuitry is coupled to a block "21, 22" which contains the comparator and flip-flop modulator circuitry shown as separate blocks 21 and 22 in FIGURE 1, and is comprised of transistors 57 and 58, capacitances 59, 61, and 62, and resistances 63, 64, 65, 66, and 67. The output of sawtooth generating circuit 19 is coupled, via an isolating network 24 comprised of an emitter-follower transistor 68 and a resistance 69 and an attenuator 25 comprised of a resistance 71 and a capacitance 72, to the modulator-comparator of block "21, 22," the output of which is coupled to, and controls the switching of, solid state switching circuit 13. A diode 73 has one of its terminals coupled to the common junction of switching circuit 13 and filter 14, and the other terminal coupled to ground potential. Diode 73 provides a path for circulating load current during the interval that switching circuit 13 is "OPEN," and is back-biased when the switching circuit is "CLOSED."

Figure 3:
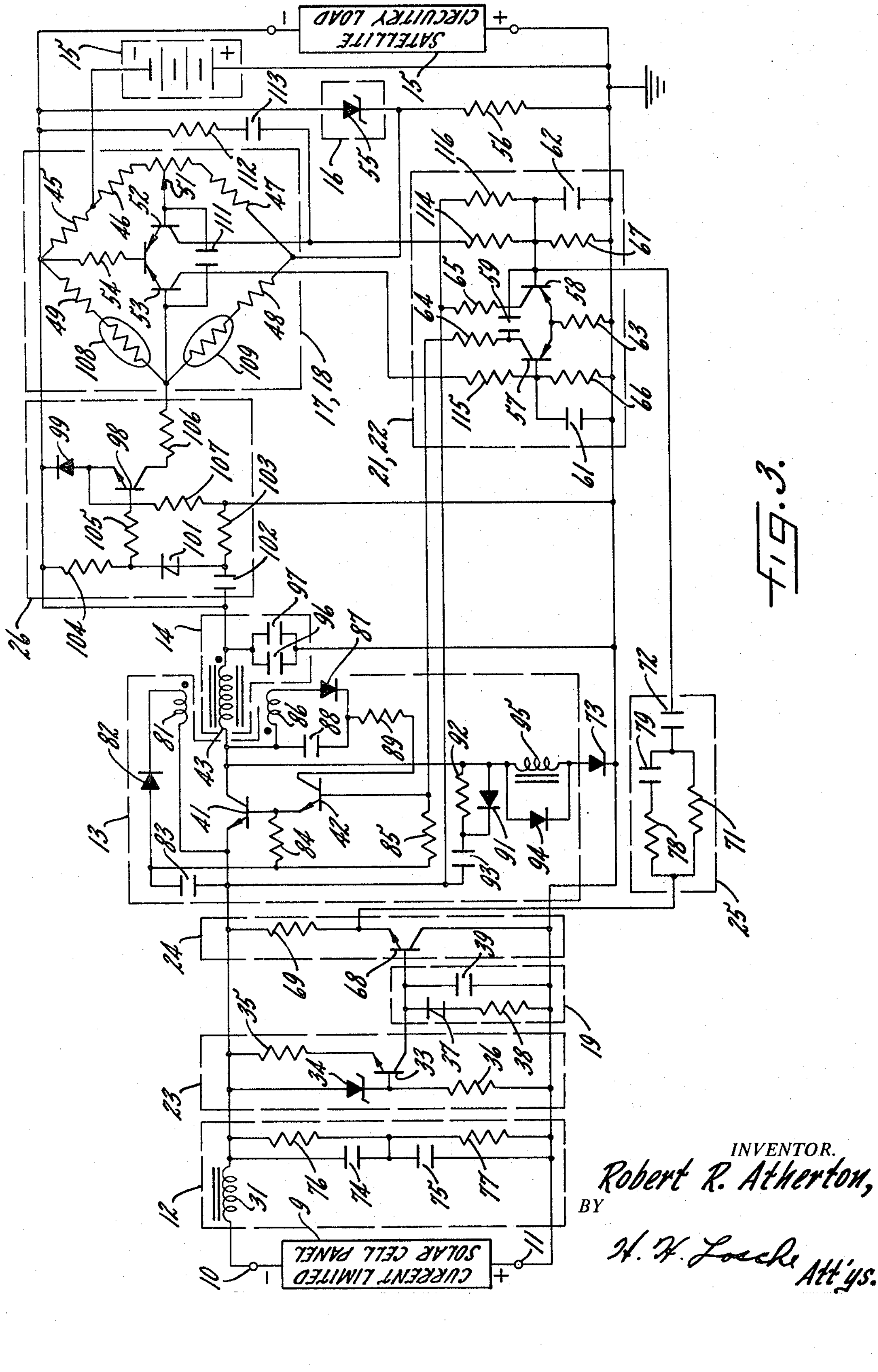
FIGURE 3 shows a schematic diagram of a second embodiment of the invention which may be utilized to regulate the energy delivered to a load when the energy source employed is a limited current source, such as a group of solar cells.

In FIGURE 3, all blocks and components equivalent to those in FIGURES 1 and 2 are indicated by corresponding numerals. The embodiment of FIGURE 3 is adapted to utilize a current limited energy source such as a solar cell panel 9 which is coupled to input terminals 10 and 11 which are, in turn, coupled to input filter circuit 12. The single capacitance 32 shown as a part of isolating filter 12 in FIGURE 2 is replaced in FIGURE 3 by capacitances 74 and 75 for voltage considerations.

These capacitances are coupled to bridging resistances 76 and 77 in order to equalize the voltage drops thereacross. Attenuator 25 has been modified by the addition of a resistance 78 and a capacitance 79 in order to increase the amount of sawtooth voltage provided by generator 19 to the comparator-modulator circuitry of block "21, 22." The solid state switching circuit 13 of this embodiment includes an auxiliary winding 81, a diode rectifier 82, a capacitance 83, and resistances 84 and 85 which form a circuit to aid "turnoff" of switching transistors 41 and 42. A second auxiliary winding 86, a diode rectifier 87, a capacitance 88, and a resistance 89 form a circuit to permit transistor 41 to thoroughly saturate during conduction while limiting the collector current of transistor 42 during saturation. A network comprised of a diode 91, a resistance 92, and a capacitance 93, and a network comprised of a diode 94 and an inductance 95 serve as commutation networks to minimize the dissipation of transistor 41 during the switching interval. In integrating filter circuit 14 the single capacitance 44 of FIGURE 2 has been replaced by parallel capacitances 96 and 97 for increased capacitance. In this embodiment, a block 26 is required for reliability in order for the invention to deliver regulated current to the load when coupled to a current limited source such as the solar cell panel of block 9. This block 26 is a regulator starting circuit and is comprised of a transistor 98 which has its emitter electrode coupled, via a diode 99, to the conductor which couples filter 14 to block "17, 18." A four layer Shockley diode 101, a capacitance 102, and resistances 103 and 104 form a low repetition rate free running multivibrator circuit which pulses transistor 98, via a resistance 105, at a regular intervals. Transistor 98 is coupled via a resistance 106 to block "17, 18," and via a resistance 107 to ground potential. The block "17, 18" of FIGURE 3 includes resistances 108 and 109 and a capacitance 111 not present in the embodiment of FIGURE 2; capacitance 111 filters any switching spikes at the bases of transistors 52 and 53 and resistance 108 and 109 are positive temperature coefficient units for limiting the temperature of the satellite battery pack portion of load 15 (which is dependent upon the rate of charge of the battery pack) to a desired amount above the ambient temperature. To accomplish this, resistance 109 is wound around the battery tubes and resistance 108 is placed in the battery ambient. As the battery temperature tends to rise above the ambient due to charging current heating, the current sensing bridge tends to unbalance in a direction resulting in a reduction in the battery charging current. Thus the battery will always be charged at the maximum rate commensurate with the permissible battery temperature rise. A resistance 112 and a capacitance 113 are coupled in series between the sommon junction of resistances 45, 49, and 54, and the collector electrode of transistor 52 for shaping the frequency response of the regulator feedback loop. In block "21, 22," a resistance 114 isolates the shaping filter network comprised of a resistance 112 and a capacitance 113 from the sawtooth trigger signal presented to the base electrode of transistor 58, and a resistance 115, equal in ohmic value to resistance 114, is coupled between block "17, 18" and the base electrode of transistor 57. A resistance 116 provides compensation against changes in the direct current input voltage applied to transistor 58.

The embodiments of the invention shown in FIGURES 2 and 3 have been constructed and satisfactorily tested. In construction of one satisfactory embodiment of FIGURE 3 the following components, values, and potentials were utilized:

| | |
|---|---|
| Transistors 33, 42, 68, and 98 | 2N2102. |
| Transistor 41 ------------ | TA2180. |
| Transistors 52 and 53 ------ | 2N2060. |
| Transistors 57 and 58 ----- | 2N2600. |
| Four-layer Shockley diode | |

| | |
|---|---|
| 37 | 4E2OM–28. |
| Four-layer Shockley diode 101 | 4E2OM–8. |
| Zener diode 34 | 1N821A. |
| Zener diode 55 | 1N3582A. |
| Diodes 73 and 94 | 1N3875. |
| Diodes 82, 87, and 99 | RD 750. |
| Diode 91 | 1N1202A. |
| Inductances 31 and 43 | 85 turns, No. 19 wire, Arnold Core A206068–2. |
| Inductance 81 | 17 turns, No. 26 wire, on core with inductance 43. |
| Inductance 86 | 8 turns, No. 26 wire, on core with inductance 43. |
| Inductance 95 | 14 turns, No. 20 wire, Arnold Core AO50056–2. |
| Capacitance 39 | .0022 mfd. |
| Capacitance 59 | 75 mmfds. |
| Capacitances 61, 83, and 88 | 33 mfds. |
| Capacitance 62 | .0033 mfd. |
| Capacitance 72 | 0.1 mfd. |
| Capacitances 74, 75, and 102 | 47 mfds. |
| Capacitance 79 | 100 mfds. |
| Capacitance 92 | .022 mfd. |
| Capacitances 96 and 97 | 22 mfds. |
| Capacitance 111 | .0047 mfd. |
| Capacitance 113 | 8.2 mfds. |
| Resistance 35 | 4,300 ohms. |
| Resistance 36 | 27,000 ohms. |
| Resistance 38 | 47 ohms. |
| Resistance 45 [1] | 0.25 ohm. |
| Resistances 46 and 47 [1] | 5,000 ohms. |
| Resistances 48 and 49 [1] | 2,500 ohms. |
| Potentiometer 51 [1] | 500 ohms. |
| Resistances 54, 64, and 65 | 2,000 ohms. |
| Resistance 56 [1] | 2,000 ohms. |
| Resistance 63 | 1,000 ohms. |
| Resistances 66 and 67 [1] | 8,200 ohms. |
| Resistances 69 and 107 | 30,000 ohms. |
| Resistance 71 | 51,000 ohms. |
| Resistances 76 and 77 | 20,000 ohms. |
| Resistance 78 | 5,600 ohms. |
| Resistance 84 | 300 ohms. |
| Resistance 85 | 3,900 ohms. |
| Resistance 89 | 10 ohms. |
| Resistance 92 | 56 ohms. |
| Resistance 103 | 100,000 ohms. |
| Resistances 104 and 105 | 2,200 ohms. |
| Resistance 106 | 110,000 ohms. |
| Resistances 108 and 109 (temperature sensitive) | 1900 ohms at 25° C. |
| Resistance 112 | 39 ohms. |
| Resistances 114 and 115 [1] | 4,700 ohms. |
| Resistance 116 [1] | 270,000 ohms. |
| Battery portion of load 15 | 32 volts. |

[1] These resistances are low temperature coefficient units.

It is to be understood that these particular components, values, and potentials are presented only for illustrative purposes and are not intended to limit the scope of the invention in any way.

FIGURES 1, 2, and 3 are all shown as negative output polarity circuits and the embodiments actually constructed were of the polarity shown. However, it is to be recognized that it is within the scope of this invention to make the necessary polarity changes, as commonly understood by one skilled in the art, to enable the operation of the invention as a positive output polarity device.

OPERATION

The operation of the invention will be initially considered with reference to the block diagram of FIGURE 1. An unregulated potential source is coupled to input terminals 10 and 11 and via isolating filter 12 to modulated solid state switching circuit 13 which is alternately opened and closed in response to control signals from flip-flop modulator circuit 22. The output of switching circuit 13 is a rectangular waveform the period of which is composed of one "ON TIME" and one "OFF TIME." The duration of this period, and the duration of "ON TIME" with respect to "OFF TIME" within any such period, are determined by the control signals applied to switching circuit 13 by the flip-flop modulator circuit 22. Thus by causing this modulator circuit 22 to vary the percentage of "ON TIME" with respect to "OFF TIME" within each period, the average value of the rectangular waveform passing from switching circuit 13 to integrating filter circuit 14 may be varied over a wide range from almost zero to the maximum negative potential available from the potential source coupled to input terminals 10 and 11. Filter circuit 14 integrates this rectangular waveform to provide an essentially smooth, direct current signal whose magnitude is equal to the average value of the rectangular waveform. This smooth, direct current signal from filter circuit 14 is provided to load 15. A sample of this signal is compared with that from reference source 16, which has been preset to a particular value after consideration of the requirements of a particular load 15, via comparator 17. Any difference between the two signals is amplified by direct current differential amplifier 18 and coupled to comparator 21, where it is mixed with the sawtooth waveform provided by sawtooth function generator circuit 19. This combined signal is applied to bistable flip-flop modulator circuit 22 to control the switching thereof from one of its stable states to the other. When modulator circuit 22 is operating in one of its two stable states, solid state switching circuit 13 is closed, thereby producing an "ON TIME" portion of a period. When circuit 22 is caused to switch to its other stable state, by a change in potential of the combined control signal applied thereto, switching circuit 13 is opened, producing an "OFF TIME" portion of a period. Thus this combined control signal applied to modulator 22 determines the length of each portion and the relative proportion of "ON TIME" with respect to "OFF TIME," of switching circuit 13 and, thereby the average value of the rectangular waveform supplied to filter circuit 14. The average value of this waveform, as previously indicated, determines the magnitude of the direct current output signal provided from filter 14 to load 15. Thus is can be seen that by controlling the opening and closing of solid state switching circuit 13 through a feedback control loop of the type shown in the block diagram of FIGURE 1, a regulated, essentially smooth direct current signal is provided to load 15 from an unregulated direct current potential source coupled to input terminals 10 and 11.

With reference to the schematic embodiment of the invention shown in FIGURE 2, an unregulated energy source 8 capable of providing relatively unlimited amounts of current is coupled to input terminals 10 and 11. This energy source 8 will supply the necessary load current to load 15 which is represented in this figure as a battery to be charged. Source 8 is coupled to load 15 via isolating filter 12, switching circuit 13, integrating filter 14, and sensing resistance 45 in block "17, 18." It will be assumed for purposes of beginning the explanation of operation of this embodiment, that transistor 41 in switching circuit 13 is open, or nonconducting, and therefore no load current is flowing from source 8 to battery 15; the potential of battery 15 has diode 73 reverse biased; and the circuit is ready to begin operation. When source 8 is initially coupled to terminals 10 and 11, sawtooth function generator 19 begins providing a sawtooth waveform via isolating network 24 and attenuating circuit 25 to the base electrode of transistor 58 in the flip-flop modulator circuitry of block "21, 22." The period of this sawtooth waveform establishes the period of the rectangular waveform created by switching circuit 13, and the slope of the sawtooth waveform, in conjunction with any control potential provided from the direct current differential amplifier in block "17, 18," determines the width of the "ON TIME" segment of each period with respect to the "OFF TIME" segment and thereby the average value of the rectangular waveform. When the sum of the potentials applied to the base of transistor 58, by the sawtooth waveform and any control potential from the differential amplifier, reach a potential which causes the modulator circuitry to switch from one of its stable states to the other, it produces a driving pulse which is conveyed to the base electrode of driving transistor 42, causing transistor 42 to place switching transistor 41 in a state of conduction thus providing the leading edge of an "ON TIME" segment of the rectangular waveform. Switching circuit 13 will remain conducting until the sawtooth waveform portion of the combined potential presented to the base of transistor 58 reaches a level which causes the flip-flop modulator circuit 22 to switch back to its first stable state, causing driving transistor 42 to stop the conduction through switching transistor 41, thereby providing the trailing edge of an "ON TIME" segment and beginning an "OFF TIME" segment of the rectangular waveform. Modulator circuit 22 will remain in this first stable state until the combined potential presented to the base of transistor 58 located therein again reaches a level causing it to switch to its other stable state, and the length of time during which modulator circuit 22 is permitted to remain in its first stable state will determine the duration of the "OFF TIME" segment of the rectangular waveform, which is the time between the trailing edge of one "ON TIME" segment and the leading edge of the following "ON TIME" segment. This rectangular waveform produced by the alternate opening and closing of modulated switching circuit 13 passes tto integrating filter circuit 14 comprised of inductance 43 and capacitance 44. The output of filter 14, which is a relatively smooth direct current potential whose magnitude is equal to the average value of the rectangular waveform applied thereto, is coupled via sensing resistance 45, which forms a portion of an arm of the bridge circuitry of comparator 17, to load 15 which in this embodiment is shown as a battery to be charged.

For simplification of explanation only, a negative current flowing in a direction opposite to conventional positive current flow will be assumed. This negative direct current flows from energy source 8 via negative input terminal 10, isolating filter circuit 12, modulated switching circuit 13 (when in a closed or "ON" condition), integrating filter circuit 14, and bridge sensing resistance 45 to the negative terminal of battery 15 to be charged. This negative current flowing through battery 15 from its negative terminal to its positive terminal charges the battery and continues to flow from the positive terminal thereof to grounded positive terminal 11 and back to source 8. Zener diode 55, comprising reference source 16, provides a regulated potential to the bridge circuitry of the comparator of block "17, 18." The charging current supplied to battery 15 is initially adjusted to the desired level by means of potentiometer 51 which determines the balance point of this bridge circuitry. Any deviation from this desired level in the charging current passing through sensing resistance 45, whether resulting from a change in the potential of energy source 8 or for other reasons, immediately unbalances the bridge circuit and is detected and amplified by the differential amplifier. This amplified deviation is coupled from transistor 52 to the base electrode of transistor 58 and utilized as a control potential to cause flip-flop modulator circuit 22 to vary the length of time which modulated switching circuit 13 remains closed during each period of the rectangular waveform produced thereby, resulting in a change in the width of the "ON TIME" segment with respect to the "OFF TIME" segment within each period, causing a change in the average value of the rectangular waveform provided to integrating filter circuit 14. This change in the average value of the waveform provided to filter 14 results in a change in the magnitude of the direct current potential which is coupled via sensing resistance 45 to the load, battery 15. This change in magnitude causes the charging current flowing through resistance 45 to balance the bridge circuitry of comparator 17 when this current reaches the preset desired level. When the bridge circuitry again becomes balanced, the bias potential applied to flip-flop modulator 22 becomes stabilized causing modulator 22 to continue to drive, or modulate, switching circuit 13 at its present rate, thereby maintaining the direct current potential applied to battery 15 at the desired level.

With reference to the embodiment of the invention shown in FIGURE 3, its basic operation is the same as that of FIGURES 1 and 2. Load 15 is represented as being comprised of a battery which is to be maintained in a charged condition and additional satellite circuitry. So long as current limited solar cell panel 9 is capable of supplying energy in excess of that necessary to charge the battery at the desired level (this capability being dependent upon the orientation of solar cell panel 9 with respect to its source of energy such as the sun, and upon the degree of degradation of the solar cells comprising the panel due to radiation damage), the invention will cause modulated switching circuit 13 therein to be alternately closed and opened for the relative lengths of time within each period which will produce a direct current potential providing the desired level of charging current to battery 15. As the potential level provided by solar panel 9 decreases, the change will be sensed by bridge resistance 45 and differential amplifier 18 will bias flip-flop modulator 22 in such manner as to cause it to increase the "ON TIME" of switching circuit 13 with respect to its "OFF TIME" within each period, in order to maintain the charging current at the desired level. As the potential available from solar panel source 9 decreases further, this condition will continue to be sensed by resistance 45, causing modulator 22 to further increase the "ON TIME" of switching circuit 13 until solar panel source 9 becomes so degraded, near the end of satellite life, that switch 13 is held in a state of constant conduction and regulation is no longer possible.

Thus it can be seen that the invention, a completely solid state switching regulator circuit, in its various embodiments is a useful and practical device which enables optimum utilization and regulation of a current limited energy source, such as a solar cell panel which is often employed as an energy source in satellite systems, without the need for, or dependency on, any external control signals such as ground-to-satellite signals, often necessitated by devices of the prior art.

Obviously many modifications and variations of this invention are possible in the light of the above teachings. It is therefore to be understood that within the scope of the appended claims the invention may be practiced otherwise than as specifically described.

I claim:

1. A regulating circuit for controlling the level of energy supplied from a source of direct current potential to a load comprising:
   - input terminal means for coupling to a source of direct current potential;
   - electrical switching means coupled to said input terminal means, said electrical switching means comprising a solid state transistor switching circuit for receiving energy from said source of direct current potential and producing a geometric waveform therefrom in response to modulating control signals;
   - electrical filter means comprising inductance means and capacitance means forming an integrating filter having input terminals coupled to said switching means for receiving said geometric waveform and having output terminals for providing a relatively smooth direct current potential thereat; and electrical sensing and control means having input terminals coupled to said output terminals of said electrical filter means for receiving said relatively smooth direct current potential therefrom, having output terminals for coupling to a load to provide said relatively smooth direct current potential thereto, and having control terminals coupled to said electrical switching means to provide modulating control signals thereto, said electrical sensing and control means being comprised of bridge comparator and differential amplifier means for continually sensing the level of energy supplied to said load, flip-flop modulating control means for producing said modulating control signals, and function generating means for producing a control signal which, in conjunction with a control signal produced by said bridge comparator and differential amplifier means, enables said flip-flop modulating control means to produce said modulating control signals which are of such magnitude, duration, and polarity as to cause the average value of said geometric waveform produced by said electrical switching means to be maintained at an adjustable preset level.

2. A regulating circuit for controlling the level of energy supplied from a source of direct current potential to a load comprising:

input terminal means for coupling to a source of direct current potential;

solid state transistor switching means coupled to said input terminal means for receiving energy from said source of direct current potential and producing a geometric waveform therefrom in response to modulating control signals;

electrical integrating filter means having input terminals coupled to said solid state transistor switching means for receiving said geometric waveform and having output terminals for providing a relatively smooth direct current potential thereat; and solid state electrical sensing and control means having input terminals coupled to said output terminals of said integrating filter means for receiving said relatively smooth direct current potential therefrom, having output terminals for coupling to a load to provide said relatively smooth direct current potential thereto, and having control terminals coupled to said solid state transistor switching means to provide modulating control signals thereto, said solid state electrical sensing and control means being comprised of bridge comparator and differential amplifier means for continually sensing the level of energy supplied to said load, flip-flop modulating control means for producing said modulating control signals, and function generating means for producing a control signal which, in conjunction with a control signal produced by said bridge comparator and differential amplifier means, enables said flip-flop modulating control means to produce said modulating control signals which are of such magnitude, duration, and polarity as to cause the average value of said geometric waveform produced by said solid state transistor switching means to be maintained at an adjustable preset level.

3. A completely solid state regulating circuit for controlling the level of energy supplied from a source of direct current potential to a load comprising:

isolating filter means having input terminals and output terminals, said input terminals being coupled to a source of direct current potential;

transistor switching means coupled to said output terminals of said isolating filter means for receiving energy from said source of direct current potential and producing a rectangular waveform therefrom in response to modulating control signals;

integrating filter means having input terminals coupled to said transistor switching means for receiving said rectangular waveform and having output terminals for providing a relatively smooth direct current potential thereat;

electrical sensing and comparison means coupled between said output terminals of said integrating filter means and a load, for sensing the level of energy being supplied thereto and producing a first control potential at control terminals proportional to any deviation in said level of energy from a preset level;

repetitive function generating means for producing a second control potential; and modulating control means having input terminals coupled to said control terminals of said electrical sensing and comparison means to receive said first control potential and also coupled to said repetitive function generating means to receive said second control potential, said first and second control potentials enabling said modulating control means to produce said modulating controls signals, and having output terminals coupled to said transistor switching means for providing said modulating control signals thereto.

4. A completely solid state regulating circuit for controlling the level of energy supplied from a source of direct current potential to a load as set forth in claim 3 wherein said transistor switching means comprises a driving transistor and a power switching transistor, said driving transistor being responsive to said modulating control signals to cause said power switching transistor to be placed in a state of conduction or nonconduction in accordance therewith.

5. A completely solid state regulating circuit for controlling the level of energy supplied from a source of direct current potential to a load as set forth in claim 4 wherein said electrical sensing and comparison means comprises bridge comparator and differential amplifier means.

6. A completely solid state regulating circuit for controlling the level of energy supplied from a source of direct current potential to a load as set forth in claim 5 wherein said repetitive function generating means comprises a sawtooth waveform generator.

7. A completely solid state regulating circuit for controlling the level of energy supplied from a source of direct current potential to a load as set forth in claim 6 wherein said modulating control means comprises a transistor flip-flop circuit.

References Cited

UNITED STATES PATENTS

| | | | |
|---|---|---|---|
| 2,776,382 | 1/1957 | Jensen | 323—22 X |
| 2,946,945 | 7/1960 | Regnier et al. | |
| 2,991,410 | 7/1961 | Seike. | |
| 3,009,093 | 11/1961 | Seike. | |
| 3,027,491 | 3/1962 | Seidle. | |
| 3,226,630 | 12/1965 | Lampke | 323—22 |
| 3,286,157 | 11/1966 | Leostic | 323—18 |
| 3,305,763 | 2/1967 | Kupferberg et al. | 323—22 |
| 3,305,767 | 2/1967 | Beihl et al. | 323—22 |

OTHER REFERENCES

Tuttle, "DC to DC Converter," IBM Technical Disclosure Bulletin, vol. 6, No. 10, March 1964, pp. 30, 31.

JOHN F. COUCH, *Primary Examiner.*

WARREN E. RAY, *Examiner.*

A. D. PELLINEN, *Assistant Examiner.*